(12) United States Patent
Nakajima

(10) Patent No.: US 6,426,782 B1
(45) Date of Patent: *Jul. 30, 2002

(54) LIQUID CRYSTAL DISPLAY DEVICE

(75) Inventor: Mutsumi Nakajima, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/146,429

(22) Filed: Sep. 3, 1998

(30) Foreign Application Priority Data

Sep. 4, 1997 (JP) .............................. 9-240086

(51) Int. Cl.⁷ ...................... G02F 1/137; G02F 1/1343; G09G 3/36
(52) U.S. Cl. ............... 349/23; 349/143; 345/87
(58) Field of Search .................. 349/143, 23; 345/86, 345/87, 90

(56) References Cited

U.S. PATENT DOCUMENTS

| | | | |
|---|---|---|---|
| 3,322,482 A | 5/1967 | Harmon ...................... 345/107 |
| 3,599,189 A | 8/1971 | Hadden et al. ............... 365/173 |
| 3,750,136 A | 7/1973 | Roess ........................... 345/87 |
| 3,876,286 A | * 4/1975 | Deutscher et al. ........... 350/160 |
| 4,822,141 A | * 4/1989 | McAdams .................... 350/330 |
| 4,925,277 A | 5/1990 | Inaba ........................... 345/97 |
| 5,153,573 A | 10/1992 | Spletter ....................... 345/84 |
| 5,282,070 A | * 1/1994 | Nishida et al. ............... 359/67 |
| 5,473,466 A | * 12/1995 | Tanielian et al. ............ 359/282 |
| 5,760,857 A | * 6/1998 | Yanagawa et al. ........... 349/43 |
| 6,236,383 B1 | 5/2001 | Nakajima et al. ............ 345/87 |

FOREIGN PATENT DOCUMENTS

| | | |
|---|---|---|
| JP | 56-145590 | 11/1981 |
| JP | 60-213924 A | 10/1985 |
| JP | 63-135923 | 6/1988 |
| JP | 1-255828 | * 10/1989 |
| JP | 7-64118 A | 3/1995 |

* cited by examiner

Primary Examiner—William L. Sikes
Assistant Examiner—Dung Nguyen
(74) Attorney, Agent, or Firm—Nixon & Vanderhye P.C.

(57) ABSTRACT

A liquid crystal display device includes a liquid crystal layer; a plurality of row signal lines for driving the liquid crystal layer; and a plurality of column signal lines for driving the liquid crystal layer, wherein an optical state of the liquid crystal layer is varied by a magnetic field produced by at least one signal line of one of the plurality of row signal lines and the plurality of column signal lines.

23 Claims, 11 Drawing Sheets

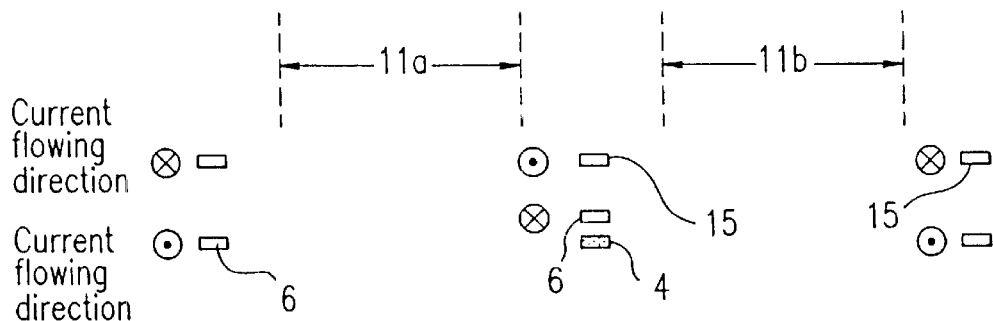
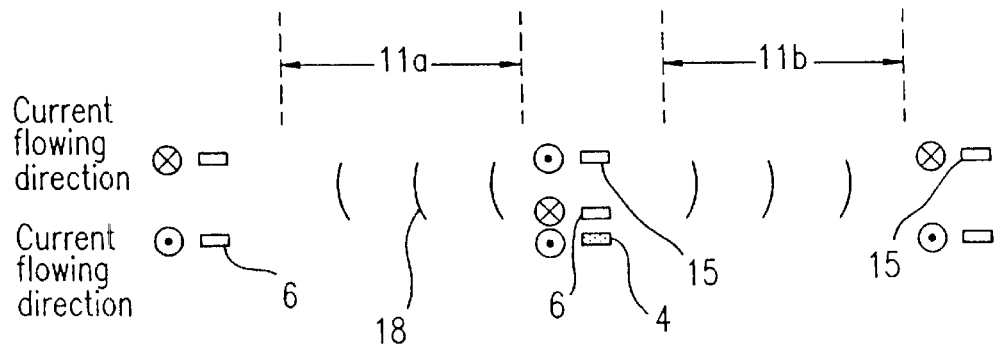

LIQUID CRYSTAL DISPLAY DEVICE

BACKGROUND OF THE INVENTION

1. Field of the Invention

The present invention relates to a liquid crystal display device for use in television sets, personal computers, word processors, office automation (OA) equipments or the like, and also relates to a method for driving the same.

2. Description of the Related Art

Since liquid crystal display devices are thin and light, they are used in, for example, television sets, personal computers, word processors and OA equipment. Many of such liquid crystal display devices utilize the fact that liquid crystal molecules have an anisotropy of refractive index and an anisotropy of dielectric constant. In such liquid crystal display devices, a voltage is applied across a liquid crystal layer, whereby optical modulation is conducted by an electric field produced by the voltage.

Since liquid crystal display devices are thin and light, they are used in, for example, television sets, personal computers, word processors and OA equipment. Many of such liquid crystal display devices utilize the fact that liquid crystal molecules have an anisotropy of refractive index and an anisotropy of dielectric constant. In such liquid crystal display devices, a voltage is applied across a liquid crystal layer, whereby optical modulation is conducted by an electric field produced by the voltage.

In such a liquid crystal display device, gate lines and source lines are arranged in a matrix, and a pixel electrode and a thin film transistor are formed at each of the regions surrounded by the gate lines and the source lines. Thus, a voltage across each pixel electrode is controlled by a corresponding thin film transistor. Such a voltage application method will be described later in detail.

Hereinafter, a conventional liquid crystal display device will be described.

FIG. 15 is a cross sectional view schematically showing the conventional liquid crystal display device. FIG. 16 is a plan view of a matrix substrate used in the conventional liquid crystal display device. FIG. 17 is a cross sectional view taken along line 17—17' of FIG. 16.

As shown in FIG. 15, the liquid crystal display device includes a matrix substrate 41, a counter substrate 42 facing the matrix substrate 41, and a liquid crystal layer 43 interposed therebetween. The liquid crystal layer 43 is formed by introducing a liquid crystal material into the gap between the matrix substrate 41 and the counter substrate 42.

In the matrix substrate 41, source lines 44, gate lines 45, thin film transistors 46 and pixel electrodes 47 are formed on a transparent substrate, as shown in FIG. 16. The transparent substrate is formed from glass or the like. The source lines 44 and the gate lines 45 are arranged in a matrix. A voltage for each pixel electrode 47 is applied from a corresponding source line 44 via a corresponding thin film transistor 46.

In the counter substrate 42 (not shown in FIG. 16), a light-shielding film (not shown), a color filter (not shown) and a planar counter-electrode (not shown) are formed on a transparent substrate. The transparent substrate is formed from glass or the like. The light-shielding film has openings corresponding to the pixel electrodes 47.

FIG. 17 shows a cross-sectional structure of the thin film transistor 46. A semiconductor layer 50 is formed on a gate electrode 48 with an insulating film 49 interposed therebetween. The gate electrode 48 extends from a corresponding gate line 45, as shown in FIG. 16. A source electrode 51 and a drain electrode 52 are formed thereon so as to be spaced apart from each other. The source electrode 51 extends from a corresponding source line 44, and is electrically connected to the source line 44. The drain electrode 52 is electrically connected to the pixel electrode 47.

As described above, many of the liquid crystal display devices which are now widely used utilize the liquid crystal's anisotropy of dielectric constant.

A liquid crystal display device using a magnetic field is proposed in Japanese Laid-open Publication No. 7-64118. The liquid crystal has also an anisotropy of magnetic susceptibility. This liquid crystal display device utilizes such an anisotropy of magnetic susceptibility. As shown in FIG. 18, this liquid crystal display device includes a pair of substrates 54 and a liquid crystal layer 55 interposed therebetween, wherein one of the pair of substrates 54 has a ferromagnetic element 53 including portions 53a and 53b. The region of the liquid crystal layer 55 which is interposed between the portions 53a and 53b is controlled by changing a magnetization of the ferromagnetic-element 53 by an external means 56 for applying a magnetic field.

A magnetic energy density fm of the liquid crystal molecules present in the magnetic field is generally given by the following expression:

$$fm = -1/2\chi_\perp H^2 - 1/2\Delta\chi(n \cdot H)^2$$

where $\Delta\chi = \chi_\parallel - \chi_\perp$: anisotropy of magnetic susceptibility;

$\chi_\parallel$: magnetic susceptibility in an alignment direction;

$\chi_\perp$: magnetic susceptibility in the direction perpendicular to the alignment direction; and n: alignment direction of the liquid crystal molecules.

In the case where a magnetic field is applied to the liquid crystal molecules having a positive anisotropy $\Delta\chi$, a moment is generated so that a magnetic energy is minimized. In other words, the liquid crystal molecules are aligned parallel to the direction of the magnetic field. In the case where a magnetic field is applied to the liquid crystal molecules having a negative anisotropy $\Delta\chi$, a moment is generated so that a magnetic energy is minimized. In other words, the liquid crystal molecules are aligned perpendicular to the direction of the magnetic field.

It is understood from the foregoing that the alignment of the liquid crystal molecules can be controlled not only by the electric field but also by the magnetic field.

A conventional liquid crystal display device using an electric field utilizes thin film transistors for applying a signal voltage corresponding to a pixel to a corresponding pixel electrode.

Stable characteristics of the thin film transistors can be obtained by accurately aligning the respective patterns of the gate electrodes, semiconductor layer, source electrodes and drain electrodes with respect to each other. More specifically, a current flowing between the source and drain electrodes of each thin film transistor is proportional to a signal voltage applied to the source electrode, and substantially inversely-proportional to the distance between the source and drain electrodes. Moreover, a parasitic capacitance substantially proportional to the overlapping width of the gate electrode with each of the source and drain electrodes is produced in the thin film transistor. A potential at each pixel is determined by the current and parasitic capacitance as described above.

The distance between the source and drain electrodes is generally designed to about 10 $\mu$m, and the overlapping width of the gate electrode with each of the source and drain electrodes is generally designed in the range of about 1 $\mu$m to about 2 μm. Furthermore, an accuracy of about 1 μm or less is required with respect to the line width and the overlapping width. Therefore, highly accurate photolithography technology is conventionally used for the exposure step. In other words, the thin film transistors are produced using an high-performance exposure apparatus including a projection lens system, whereby the accuracy of about 1 μm or less is satisfied.

Moreover, the semiconductor layer for the thin film transistors is generally formed from amorphous silicon (a-Si). In order to form a high-quality a-Si film, a PE-CVD (plasma enhanced chemical vapor deposition) apparatus must be used.

Such a liquid crystal display device has a high display quality. However, an expensive production apparatus is required because a highly accurate photolithography technology and a PE-CVD process are used. Moreover, such photolithography technology and PE-CVD process result in a poor production capability. Furthermore, the production process must be strictly managed.

According to the conventional example, charges based on the applied image signal are retained using the liquid crystal layer as a capacitor. Therefore, the liquid crystal layer must have a high specific resistance. However, in the case where the liquid crystal display device is driven at a high temperature of, for example, about 70° C., the specific resistance of the liquid crystal layer may be disadvantageously reduced due to the ionic impurities produced within the liquid crystal layer, resulting in non-uniformity of the display. As a result, the production yield is reduced.

As can be seen from the foregoing, the conventional liquid crystal display device has difficulties in reducing the production cost and in improving the production yield.

The liquid crystal display devices are thin and light, as described above. However, for the above-mentioned reasons, the liquid crystal display devices are more expensive than the other image display devices such as a cathode ray tube (CRT). This is the main factor preventing the liquid crystal display devices from being used in a wider variety of apparatuses. Therefore, development of the liquid crystal display devices capable of being produced by a simple process has been desired.

Regarding the liquid crystal display device using a magnetic field, the above-cited Japanese Laid-open Publication No. 7-64118 describes the principle that the optical state of the liquid crystal layer can be changed by a magnetic field produced by a magnetic material. However, the actual driving method is not clearly described. In other words, Japanese Laid-open Publication No. 7-64118 fails to describe the liquid crystal display device having pixels arranged in a matrix, and a method for driving the same. More specifically, Japanese Laid-open Publication No. 7-64118 fails to describe a method for driving the liquid crystal display device which is used as an image display device in television sets, personal computers, word processors, OA equipments and the like. Accordingly, the liquid crystal display device described in Japanese Laid-open Publication No. 7-64118 can not be substituted for the conventional liquid crystal display device used as the image display device.

SUMMARY OF THE INVENTION

According to one aspect of the present invention, a liquid crystal display device includes: a liquid crystal layer; a plurality of row signal lines for driving the liquid crystal layer; and a plurality of column signal lines for driving the liquid crystal layer, wherein an optical state of the liquid crystal layer is varied by a magnetic field produced by at least one signal line of one of the plurality of row signal lines and the plurality of column signal lines.

In one example, at least one signal line of one of the plurality of row signal lines and the plurality of column signal lines is partially bent so as to have a signal line portion extending parallel to at least one signal line of the other of the plurality of row signal lines and the plurality of column signal lines, the signal line portion and the at least one signal line forming a parallel portion, and an optical state of the liquid crystal layer is varied by a magnetic field produced by at least one of the signal line portion and the at least one signal line which form the parallel portion.

In one example, at least one signal line of one of the plurality of row signal lines and the plurality of column signal lines is a first signal line, the first signal line being partially bent so as to have a signal line portion extending parallel to at least one other signal line of the other of the plurality of row signal lines and the plurality of column signal lines, the signal line portion and the at least one other signal line forming a parallel portion, the one of the plurality of row signal lines and the plurality of column signal lines includes a second signal line which is partially bent so as to overlap the first signal line, the second signal line and the first signal line interposing the liquid crystal layer therebetween, and an optical state of the liquid crystal layer is varied by a magnetic field produced by at least one of the second signal line, the signal line portion and the at least one other signal line.

In one example, a ferromagnetic element piece is provided adjacent to at least one of the signal line portion and the at least one signal line which form the parallel portion, and an optical state of the liquid crystal layer is varied by a magnetic field from the ferromagnetic element piece magnetized by the magnetic field produced by at least one of the signal line portion and the at least one signal line which form the parallel portion.

In one example, a ferromagnetic element piece is provided adjacent to at least one of the signal line portion and the at least one other signal line, and an optical state of the liquid crystal layer is varied by a magnetic field from the ferromagnetic element piece magnetized by the magnetic field produced by at least one of the signal line portion and the at least one other signal line.

In one example, a shielding electrode for preventing an electric field from being formed within pixel regions is formed in an inner periphery of each of the pixel regions, an optical state of each of the pixel regions being independently varied by a magnetic field from the plurality of row signal lines and the plurality of column signal lines.

In one example, an alignment direction of liquid crystal molecules in the liquid crystal layer is controlled by controlling a current flowing in the plurality of the row signal lines and the plurality of column signal lines.

According to another aspect of the present invention, a method for driving the liquid crystal display device includes the steps of: applying an image signal to the ferromagnetic element piece during a write period; and prior to the write period, sequentially applying a magnetic field for causing a magnetic field at the ferromagnetic element piece to have saturated magnetization, and an inverted magnetic field for eliminating magnetization of the ferromagnetic element piece, by using a magnetic field from at least one of the plurality of row signal lines and the plurality of column signal lines.

According to still another aspect of the present invention, a liquid crystal display device includes: a liquid crystal layer interposed between a pair of substrates; a plurality of first signal lines producing a magnetic field to be applied to the liquid crystal layer; and a plurality of second signal lines producing a magnetic field to be applied to the liquid crystal layer, wherein the liquid crystal layer includes a plurality of pixel regions arranged in a matrix, an optical state of each of the plurality of pixel regions is independently varied by the magnetic field produced by the plurality of first signal lines and the plurality of second signal lines, each of the plurality of first signal lines alternately has a plurality of first portions extending in a first direction and a plurality of second portions extending in a second direction perpendicular to the first direction, each of the plurality of second signal lines is provided in a vicinity of a respective one of the plurality of first portions and is respectively located between two other of the plurality of first portions which are adjacent to the respective one of the plurality of first portions, and an optical state of each of the plurality of pixel regions is varied by a magnetic field produced by the one of the plurality of first portions, the two other of the plurality of first portions, and a respective one of the plurality of second signal lines.

In one example, the liquid crystal display device further includes a third signal line formed on one of the substrates which faces the other substrate having the first signal lines, the third signal line having a shape overlapping a shape of the first signal lines, wherein an optical state of each of the plurality of pixel regions is varied by a magnetic field produced by the one of the plurality of first portions, the two other of the plurality of first portions, a respective one of the plurality of second signal lines, and the third signal line.

In one example, the liquid crystal display device further includes a ferromagnetic element piece provided adjacent to the plurality of first portions of the first signal lines, wherein an optical state of each of the plurality of pixel regions is varied by a magnetic field from the ferromagnetic element piece magnetized by the one of the plurality of first portions, the two other of the plurality of first portions, a respective one of the plurality of second signal lines, and the third signal line.

According to a liquid crystal display device of the present invention, an optical state of a liquid crystal layer is varied by a magnetic field produced by at least one of row signal lines and column signal lines. Therefore, an image can be displayed by, for example, pixels arranged in a matrix, whereby non-uniform display depending upon the specific resistance of the liquid crystal layer will not be produced.

At least one signal line of the row signal lines and/or the column signal lines is bent so as to have a portion extending parallel to a corresponding column signal line, whereby the portion and the corresponding column signal line form a parallel portion. With such a structure, the liquid crystal display device can be driven on a pixel-by-pixel basis. Moreover, the liquid crystal layer can be driven by using the structure and production process which do not require a high pattern accuracy. As a result, an excellent display quality can be obtained.

A ferromagnetic element piece is formed adjacent to at least one signal line of the row signal lines and/or the column signal lines. The ferromagnetic element is magnetized by a magnetic field produced by at least one of a corresponding row signal line and/or a corresponding column signal line, and a magnetic field to be applied to a pixel region is produced by the magnetized ferromagnetic element piece. Therefore, a magnetic field to be applied to the pixel region can be increased.

A shielding electrode for preventing an electric field from being formed within a pixel region by a magnetic field from the row signal lines and the column signal lines is formed in a periphery of each pixel region. Accordingly, a voltage across the row signal lines and the column signal lines can be increased, whereby a sufficient magnetic field can be produced by the row signal lines and the column signal lines.

An alignment direction of the liquid crystal in the pixel regions is controlled by controlling a current across the row signal lines and the column signal lines.

Therefore, a magnetic field can be arbitrarily controlled.

At least one of the row signal lines, the column signal lines, the shielding electrodes and insulating layers provided therebetween, or at least one of the row signal lines, the column signal lines, the shielding electrodes, the ferromagnetic element pieces and insulating layers provided therebetween is formed by a printing method. Therefore, expensive apparatuses having a poor production capability, such as a vacuum film-forming apparatus and an exposure apparatus, are not necessary. As a result, significant reduction in production cost can be achieved.

At least one of the insulating layers provided between the row signal lines, the column signal lines and the shielding electrodes, or at least one of the insulating layers provided between the row signal lines, the column signal lines, the shielding electrodes and the ferromagnetic element pieces is formed by a coating method. Therefore, an expensive vacuum film-forming apparatus having a poor production capability is not necessary. As a result, significant reduction in production cost can be achieved.

According to a method for driving a liquid crystal display device of the present invention, (i) a magnetic field exceeding saturated magnetization of the ferromagnetic element pieces and (ii) an inverted magnetic field which eliminates magnetization of the ferromagnetic element pieces are sequentially applied to at least one of the row signal lines and the column signal lines for a prescribed time period prior to a write period for applying an image signal to the ferromagnetic element pieces. Therefore, magnetization of the ferromagnetic element pieces can be arbitrarily controlled to a level corresponding to the applied image signal.

Thus, the invention described herein makes possible the advantages of (1) providing an inexpensive liquid crystal display device capable of achieving both reduction in production cost and improvement in production yield, and (2) providing a method for driving the same.

These and other advantages of the present invention will become apparent to those skilled in the art upon reading and understanding the following detailed description with reference to the accompanying figures.

BRIEF DESCRIPTION OF THE DRAWINGS

FIG. 3 is a cross sectional view schematically showing a magnetic field at a pixel region in the liquid crystal display device according to Example 1 of the present invention;

FIG. 4 is a cross sectional view schematically showing a magnetic field at a pixel region in the liquid crystal display device according to Example 1 of the present invention;

DESCRIPTION OF THE PREFERRED EMBODIMENTS

Figure 1:
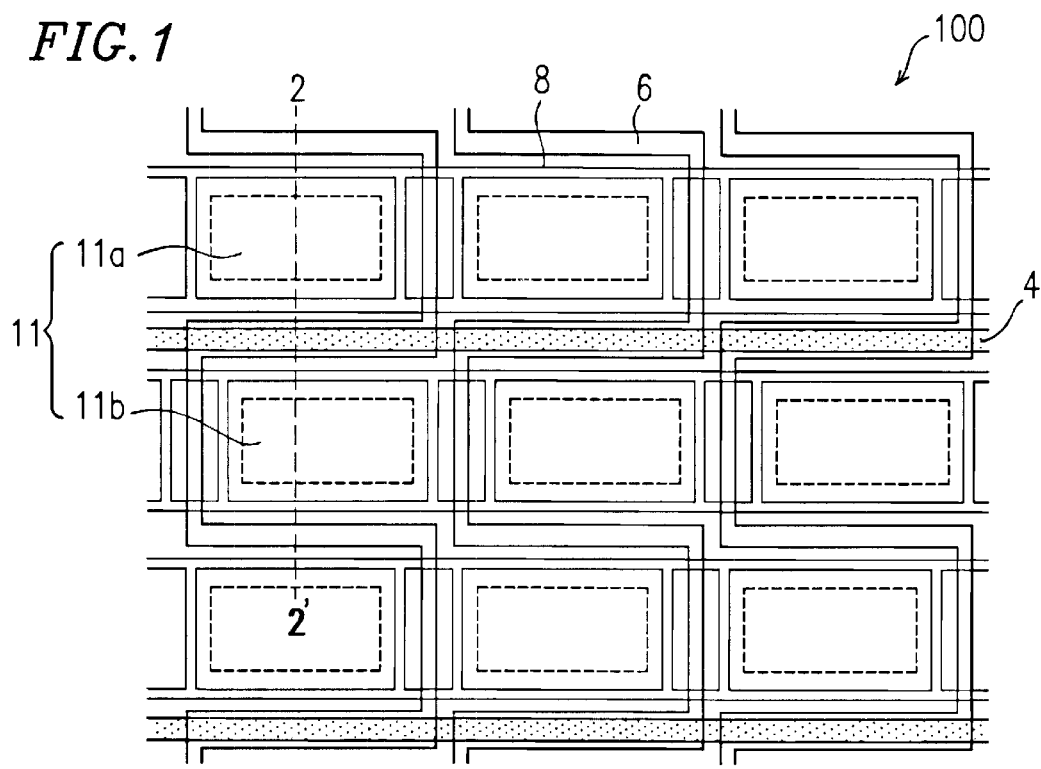
FIG. 1 is a plan view of a liquid crystal display device according to Example 1 of the present invention, wherein a counter substrate facing a matrix substrate is omitted.

Hereinafter, the present invention will be described by way of illustrative examples with reference to the accompanying drawings. The same reference numerals designate the same components.

EXAMPLE 1

Hereinafter, Example 1 of the present invention will be described.

Figure 2:
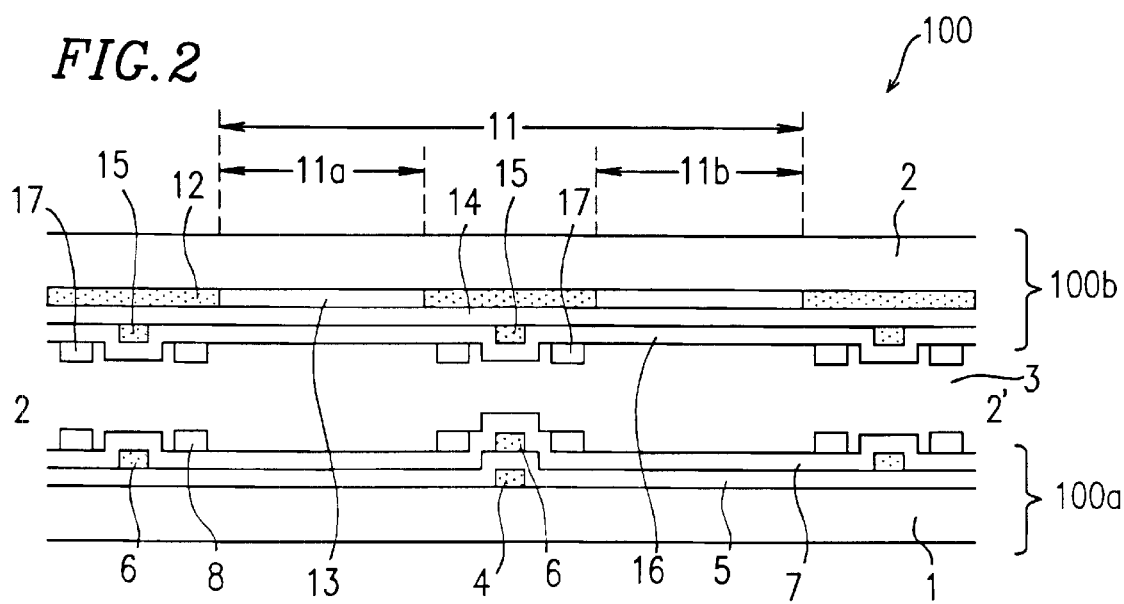
FIG. 2 is a cross sectional view taken along line 2–2' of FIG. 1.

FIG. 1 is a plan view of a liquid crystal display device 100 according to Example 1 of the present invention. Note that a counter electrode 100b as shown in FIG. 2 is omitted in FIG. 1. FIG. 2 is a cross sectional view taken along line 2–2' of FIG. 1.

The liquid crystal display device 100 includes a matrix substrate 100a, the counter substrate 100b facing the matrix substrate 100a, and a liquid crystal layer 3 interposed therebetween. The liquid crystal layer 3 is formed by introducing a liquid crystal material into the gap between the matrix substrate 100a and the counter substrate 100b. The structure of the liquid crystal display device 100 will now be described in detail according to the order of production steps.

The matrix substrate 100a is produced as follows: an Al film having a thickness of about 2000 Å is formed on a first glass substrate 1 by a sputtering method. The Al film thus formed is etched using a resist pattern by a proximity large-scale exposure technique, whereby row signal lines 4 are formed. Then, an insulating film 5 of $Ta_2O_5$ having a thickness of about 2500 Å is formed by a sputtering method.

Next, an Al film having a thickness of about 2000 Å is formed thereon by a sputtering method. The Al film thus formed is etched using a resist pattern by using a proximity large-scale exposure technique, whereby first column signal lines 6 are formed. Then, an insulating film 7 of $Ta_2O_5$ having a thickness of about 2500 Å is formed by a sputtering method.

Thereafter, an Al film having a thickness of about 2000 Å is formed thereon by a sputtering method. The Al film thus formed is etched using a resist pattern by using a proximity exposure technique, whereby shielding electrodes 8 are formed. Thus, the matrix substrate 100a is completed.

The counter substrate 100b is produced as follows: a light-shielding film 12 having openings 11a and 11b is formed on a second glass substrate 2. The openings 11a and 11b correspond to the regions surrounded by the row signal lines 4 and the column signal lines 6 of the matrix substrate 100a. A color filter 13 is formed in the openings 11a and 11b. A coating film 14 is formed over the color filter 13. A single pixel region 11 corresponding to a single pixel includes a pair of openings 11a and 11b interposing a corresponding row signal line 4 therebetween.

Then, an Al film having a thickness of about 2000 Å is formed thereon by a sputtering method. The Al film thus formed is etched using a resist pattern by a proximity large-scale exposure technique, whereby second column signal lines 15 are formed. Then, an insulating film 16 of $Ta_2O_5$. having a thickness of about 2500 Å is formed by a sputtering method.

Thereafter, an Al film having a thickness of about 2000 Å is formed thereon by a sputtering method. The Al film thus formed is etched using a resist pattern by using a proximity large-scale exposure technique, whereby shielding electrodes 17 are formed. Thus, the counter substrate 100b is completed.

Then, an alignment film of polyimide (not shown) is formed by a printing method on each of the surfaces of the matrix substrate 100a and the counter substrate 100b facing the liquid crystal layer. The alignment films thus formed are subject to a rubbing treatment. Thereafter, using, for example, a spacer (not shown), the matrix substrate 100a and the counter substrate 100b are attached to each other with a prescribed space therebetween, and a liquid crystal material having a positive anisotropy of magnetic susceptibility is introduced into the gap between the matrix substrate 100a and the counter substrate 100b. Then, a sealing process is conducted, whereby the liquid crystal layer 3 is formed. Thus, the liquid crystal display device 100 is completed. Note that the respective rubbing directions of the alignment films (not shown) are shifted by 90° from each other so as to obtain a TN (twisted nematic) type alignment having a 90° twist.

The row signal lines 4, the first column signal lines 6, the second column signal lines 15, the shielding electrodes 8 and 17 and the pixel regions 11 will now be described in detail with respect to their patterns.

Each of the first column signal lines 6 has a bent pattern as shown in FIG. 1 so as to have laterally extending portions, that is, portions extending in the row direction. Therefore, the laterally extending portions are parallel to the row signal lines 4. Thus, each of the laterally extending portions and a corresponding portion of the row signal lines form a parallel portion. Each of the second column signal lines 15 has a bent pattern similar to the first column signal lines 6. The bent pattern of the second column signal lines 15 has a mirror-image relationship with that of the first column signal lines 6 when viewed from either one of the first and second glass substrates 1 and 2. The matrix substrate 100a and the counter substrate 100b are attached to each other in such a manner that the pattern of the first column signal lines 6 faces and overlaps the pattern of the second column signal lines 15.

The row signal lines 4 are located such that the ratio of the number of the row signal lines 4 to the number of the laterally extending portions of each of the column signal lines 6 and 15 is 1:2. More specifically, the row signal lines 4 are located so as to correspond to every other laterally extending portion of each of the column signal lines 6 and 15. The single pixel region 11 corresponding to a single pixel includes a pair of openings 11a and 11b interposing a corresponding row signal line 4 therebetween, as described above. The shielding electrodes 8 and 17 are formed so as to surround each of the openings 11a and 11b.

Hereinafter, a method for driving the liquid crystal display device 100 according to Example 1 of the present invention will be described with reference to FIGS. 3 and 4. FIGS. 3 and 4 are schematic diagrams illustrating a magnetic field at a pixel region, and each of FIGS. 3 and 4 corresponds to a cross sectional view taken along line 2–2' of FIG. 1.

A current for column selection is supplied to the column signal lines 6 and 15, whereas a small current corresponding to an image signal is supplied to the row signal lines 4. The shielding electrodes 8 and 17 are connected to ground.

In Example 1, a current flows in the same direction across each of the first column signal lines 6 on the matrix substrate 100a. Similarly, a current flows in the same direction across each of the second column signal lines 15 on the counter substrate 100b. Each pair of first and second column signal lines 6 and 15 facing each other with the liquid crystal layer 3 therebetween have opposite current-flowing directions. A description of a case where the first and second column signal lines 6 and 15 have the same absolute current value will now be given for a single pixel with reference to FIG. 3.

As described above, each pair of first and second column signal lines 6 and 15 facing each other with the liquid crystal layer 3 therebetween have the opposite current flowing directions. Moreover, a current flowing in the row signal lines 4 is small. Therefore, a magnetic field induced within the liquid crystal layer 3 is offset. Accordingly, no magnetic field is produced especially in the pixel regions 11.

Hereinafter, a description of a case where the first and second column signal lines 6 and 15 have different absolute current values will be given for a single pixel with reference to FIG. 4.

In this case, a magnetic field 18 (i.e., a synthesized magnetic field of a magnetic field corresponding to the difference in current between the first and second column signal lines 6 and 15 and a magnetic field produced by a current across the row signal lines 4) can be produced within the pixel region 11. Therefore, it is understood that, by supplying different currents to the first and second column signal lines 6 and 15, a synthesized magnetic field of the row signal lines 4, the first column signal lines 6 and the second column signal lines 15 can be produced within each pixel region 11. Since a liquid crystal material having a positive anisotropy of magnetic susceptibility is used, the liquid crystal molecules are aligned vertically to the matrix and counter substrates 100a and 100b according to the strength of the produced vertical magnetic field.

A single pixel region 11 is defined as a region in which its optical state is independently varied according to a magnetic field from three successive laterally extending portions of each of the first and second column signal lines 6 and 15, two of which define an outer periphery of the pixel region, and a magnetic field from the row signal line 4 provided in the vicinity of the laterally extending portion located between the two laterally extending portions defining the outer periphery. Therefore, a matrix addressing method wherein the first and second column signal lines 6 and 15 have different absolute current values during a row selection period, while having the same absolute current value during a non-selection period, can be conducted.

In Example 1, each of the row signal lines 4 has a line width of, for example, 30 μm, and each of the first and second column signal lines 6 and 15 has a line width of, for example, 30 μm. During a row selection period, respective current values flowing across the first and second column signal lines 6 and 15 are, for example, 20 mA and 200 mA, and a current value flowing across the selected row signal line 4 is 10 mA. During a non-selection period, a current flowing across the first and second column signal lines 6 and 15 is AA=20 mA. A preferred liquid crystal material used in Example 1 includes a liquid crystal material having an anisotropy of magnetic susceptibility.

As described above, upon driving of the liquid crystal display device 100, a voltage is applied to the row signal lines 4 and the first and second column signal lines 6 and 15 in order to supply a current thereto. The shielding electrodes 8 and 17 are formed so as to surround the openings 11a and 11b. Thus, the shielding electrodes 8 and 17 serve to intercept an electric field produced by each of the row signal lines 4 and the column signal lines 6 and 15, preventing defective orientation of the liquid crystal molecules due to leakage of the electric field. Accordingly, the optical state of the liquid crystal layer 3 can be controlled by a magnetic field even when a high voltage is applied to the row signal lines 4 and the column signal lines 6 and 15. As a result, limitations on interconnection resistance; capacitance of the insulating layers; resistivity and dielectric constants of the materials used; film thickness; and line width, are significantly reduced.

It should be noted that a ferromagnetic material may alternatively be provided in the vicinity of the row signal lines 4, the first column signal lines 6 and/or the second column signal lines 15, in order to enhance a magnetic field.

In the liquid crystal display device of Example 1, patterning was conducted by a photolithography process using a proximity large-scale exposure technique, whereby a patterning accuracy of about 10 μm was obtained. Although this accuracy is lower than that (i.e., about 1 μm) achieved by the above-mentioned conventional highly-accurate photolithography technology, no defective display was recognized in the liquid crystal display device of Example 1.

Moreover, an inexpensive apparatus was able to be used for the photolithography process. Also, the time required for the exposure step was reduced by several times as compared to the conventional photolithography technology. Moreover, the films were formed by a sputtering method, whereby the need for a PE-CVD apparatus, which has been indispensable for forming a thin film transistor in the conventional examples, is eliminated. As a result, reduction in the production cost as well as improvement in the production capability can be achieved.

EXAMPLE 2

Hereinafter, Example 2 of the present invention will be described.

Figure 5:
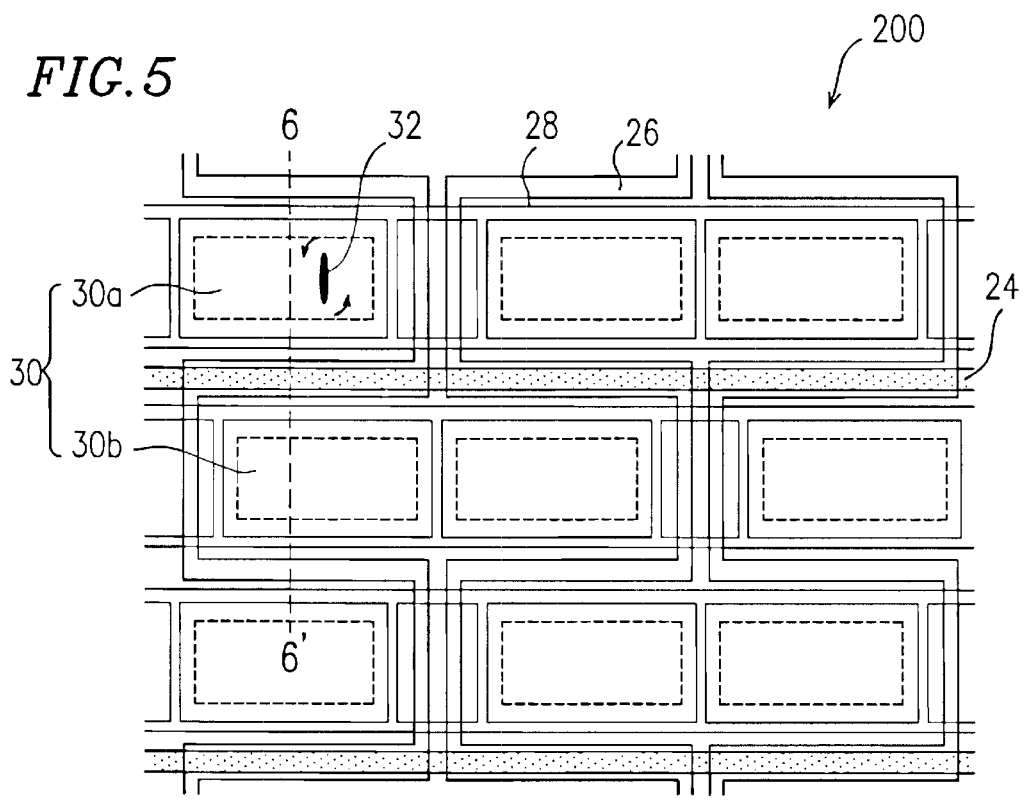
FIG. 5 is a plan view of a liquid crystal display device according to Example 2 of the present invention, wherein a counter substrate facing a matrix substrate is omitted.
Figure 6:
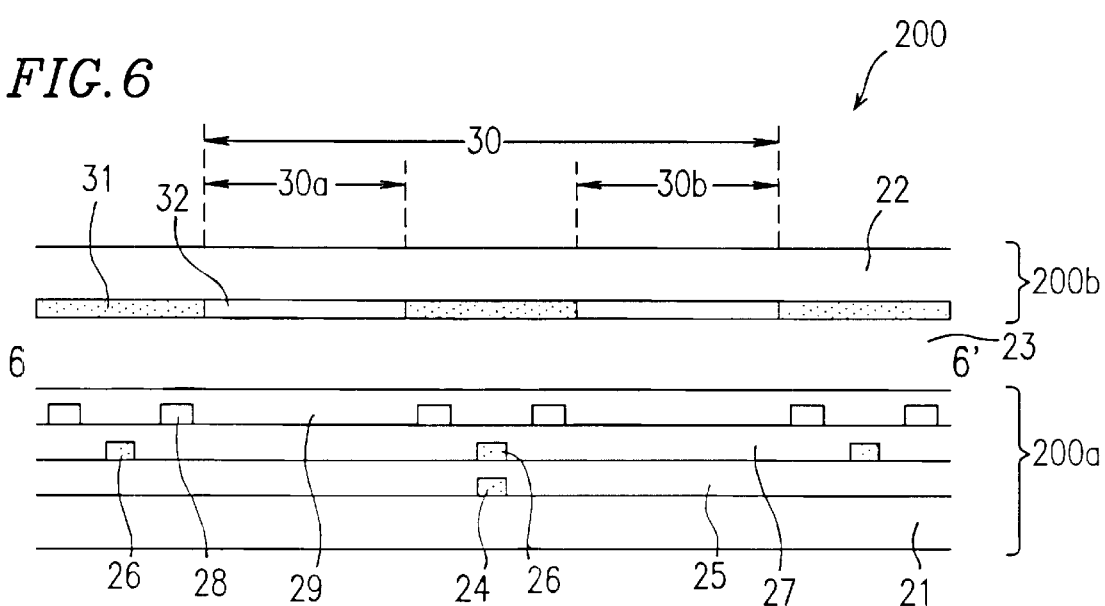
FIG. 6 is a cross sectional view taken along line 6–6' of FIG. 5.

FIG. 5 is a plan view of a liquid crystal display device 200 according to Example 2 of the present invention. Note that a counter electrode 200b as shown in FIG. 6 is omitted in FIG. 5. FIG. 6 is a cross sectional view taken along line 6–6' of FIG. 5.

The liquid crystal display device 200 includes a matrix substrate 200a, the counter substrate 200b facing the matrix substrate 200a, and a liquid crystal layer 23 interposed therebetween. The liquid crystal layer 23 is formed by introducing a liquid crystal material into the gap between the matrix substrate 200a and the counter substrate 200b. The structure of the liquid crystal display device 200 will now be described in detail according to the order of production steps.

The matrix substrate 200a is produced as follows: an electrically conductive Ag paste is applied on a first glass substrate 21 by a printing method, whereby row signal lines 24 having a thickness of about 1 μm are formed. Then, the resultant substrate 21 is coated with $SiO_2$ by a dipping process using a sol-gel method, whereby an insulating film 25 having a thickness of about 1.5 μm is formed.

Then, an electrically conductive Ag paste is applied thereon by a printing method, whereby column signal lines 26 having a thickness of about 1 μm are formed. Then, the resultant substrate 21 is coated with $SiO_2$ by a dipping process using a sol-gel method, whereby an insulating film 27 having a thickness of about 1.5 μm is formed.

Thereafter, an electrically conductive Ag paste is applied thereon by a printing method, whereby shielding electrodes 28 having a thickness of about 1 μm are formed. Then, the resultant substrate 21 is coated with $SiO_2$ by a dipping process using a sol-gel method, whereby an insulating film 29 having a thickness of about 1.5 μm is formed. Thus, the matrix substrate 200a is completed.

It should be noted that, instead of the dipping process, a spin coating method or a printing method can alternatively be used to form each of the insulating films.

The counter substrate 200b is produced as follows: a light-shielding film 31 having openings 30a and 30b is formed on a second glass substrate 22. The openings 30a and 30b correspond to the regions surrounded by the row signal lines 24 and the column signal lines 26 of the matrix substrate 200a. A color filter 32 is formed in the openings 30a and 30b. Thus, the counter substrate 200b is completed. A single pixel region 30 corresponding to a single pixel includes a pair of openings 30a and 30b interposing a corresponding row signal line 24 therebetween.

Then, an alignment film of polyimide (not shown) is formed by a printing method on each of the surfaces of the matrix substrate 200a and the counter substrate 200b facing the liquid crystal layer 23. The alignment films thus formed are subject to a rubbing treatment. Thereafter, using, for example, a spacer (not shown), the matrix substrate 200a and the counter substrate 200b are attached to each other with a prescribed space therebetween, and a liquid crystal material having a negative anisotropy of magnetic susceptibility is introduced into the gap between the matrix substrate 200a and the counter substrate 200b. Then, a sealing process is conducted, whereby the liquid crystal layer 23 is formed. Thus, the liquid crystal display device 200 of Example 2 is completed.

The row signal lines 24, the column signal lines 26, the shielding electrodes 28 and the pixel regions 30 will now be described in detail with respect to their patterns.

Each of the first column signal lines 26 has a bent pattern as shown in FIG. 5 so as to have laterally extending portions, that is, portions extending in the row direction. Therefore, the laterally extending portions are parallel to the row signal lines 24. Thus, each of the laterally extending portions and a corresponding portion of the row signal lines 24 form a parallel portion. The bent patterns of adjacent column signal lines 26 are symmetric with each other. Accordingly, every other row signal line 24 has the same bent pattern.

The row signal lines 24 are located such that the ratio of the number of the row signal lines 24 to the number of the laterally extending portions of each of the column signal lines 26 is 1:2. More specifically, the row signal lines 24 are located so as to correspond to every other laterally extending portion of each of the column signal lines 26. A single pixel region 30 corresponding to a single pixel includes the pair of openings 30a and 30b interposing a corresponding row signal line 24 therebetween, as described above. The shielding electrodes 28 are formed so as to surround each of the openings 30a and 30b.

Figure 7:
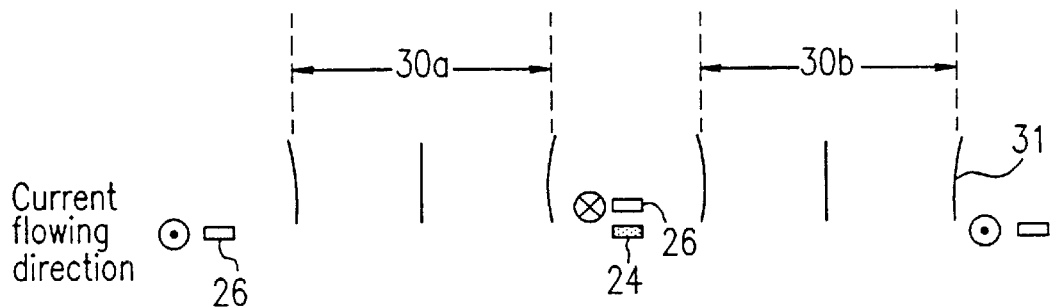
FIG. 7 is a cross sectional view schematically showing a magnetic field at a pixel region in the liquid crystal display device according to Example 2 of the present invention.
Figure 8:
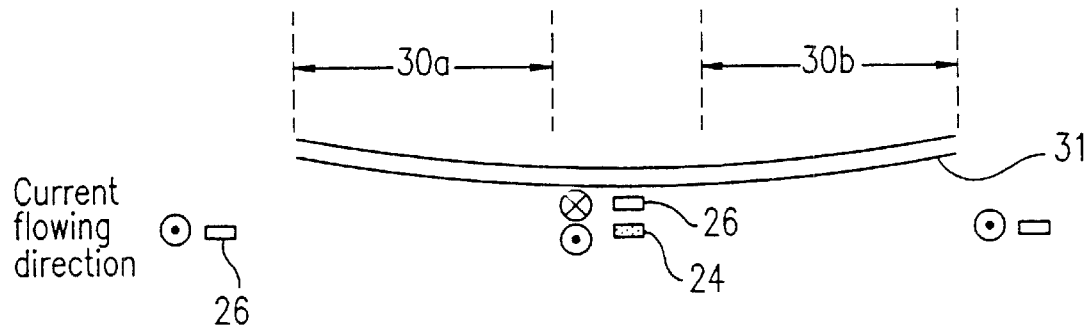
FIG. 8 is a cross sectional view schematically showing a magnetic field at a pixel region in the liquid crystal display device according to Example 2 of the present invention.

Hereinafter, a method for driving the liquid crystal display device 200 according to Example 2 of the present invention will be described with reference to FIGS. 7 and 8. FIGS. 7 and 8 are schematic diagrams illustrating a magnetic field at a pixel region, and each of FIGS. 7 and 8 corresponds to a cross sectional view taken along line 6–6' of FIG. 5. In FIG. 7, a current is not supplied to the row signal lines 24. In FIG. 8, a current is supplied to the row signal lines 24 such that the current flowing direction in the row signal lines 24 is opposite to that in the laterally extending portions of the column signal lines 26.

The current flowing direction in the column signal lines 26 is reversed on a line-by-line basis. In other words, every other signal line 26 has the same current flowing direction. The shielding electrodes 28 are connected to ground.

A description of a case where a current is not supplied to the row signal lines 24 will now be given with reference to FIG. 7.

Since each of the column signal lines 26 have a bent pattern as described above, the current flowing direction in the laterally extending portions of each column signal line 26 is alternated. More specifically, the current flowing direction in the column signal lines 26 is reversed on a line-by-line basis, as described above. Furthermore, all of the laterally extending portions have the same absolute current value. Therefore, a magnetic field 31 produced at each pixel region 30 is vertical to the substrate surface. Accordingly, liquid crystal molecules 32 are horizontally aligned with respect to the surface of the substrate so as to be perpendicular to the row signal lines 24. Moreover, since a liquid crystal material having a negative anisotropy of magnetic susceptibility is used, no moment is produced for the vertical magnetic field.

A description of a case where a current is supplied to the row signal lines 24 such that the current flowing direction in the row signal lines 24 is opposite to that in the laterally extending portions of the column signal lines 26 will now be given with reference to FIG. 8.

In this case, a magnetic field from the laterally extending portions of the column signal lines 26 which are adjacent to the row signal lines 24 is offset and reduced. Accordingly, in the case where the absolute current value of the row signal lines 24 is equal to that of the column signal lines 26, no magnetic field is produced from the laterally extending portions of the column signal lines 26 which are adjacent to the row signal lines 24. A current flows in the same direction in each of the other laterally extending portions of the column signal lines 26, that is, a pair of laterally extending portions of the column signal lines 26 which are not adjacent to the row signal lines 24. Therefore, a magnetic field 31 is produced horizontally to the substrate. The strength of the horizontal magnetic field 31 can be arbitrarily controlled by varying a current value in each of the column signal lines 26.

Liquid crystal molecules 32 are horizontally aligned so as to be perpendicular to the row signal lines 24. Since a liquid crystal material having a negative anisotropy of magnetic susceptibility is used, the liquid crystal molecules 32 are affected by a horizontal magnetic field produced in the direction perpendicular to the row signal lines 24. Accordingly, a moment horizontally rotating the liquid crystal molecules 32 is produced, as shown in FIG. 5.

A single pixel region 30 is defined as a region in which its optical state is independently varied according to a magnetic field from three successive laterally extending portions of each of the column signal lines 26, two of which define an outer periphery of the pixel region, and a magnetic field from the row signal line 24 provided in the vicinity of the laterally extending portion between the two laterally extending portions defining the outer periphery. Therefore, a matrix addressing method wherein a current is supplied to the row signal lines during a row selection period, whereas no current is supplied to the row signal lines during a non-selection period, can be conducted. According to the matrix addressing method, a vertical magnetic field is produced during the non-selection period. On the other hand, an arbitrary current is supplied to the row signal lines during the row selection period, whereby a horizontal magnetic field of each pixel region is controlled. In this way, the orientation of the liquid crystal molecules can be changed according to the horizontal magnetic field, whereby optical modulation is achieved.

Upon driving of the liquid crystal display device 200, a voltage is applied to the row signal lines 24 and the column signal lines 26 in order to supply a current thereto. The shielding electrodes 28 are formed so as to surround the openings 30a and 30b. Thus, the shielding electrodes 28 serve to intercept an electric field produced by each of the row signal lines 24 and the column signal lines 26, preventing defective orientation of the liquid crystal molecules due to the leakage of the electric field. Accordingly, the optical state of the liquid crystal layer 23 can be controlled by a magnetic field even when a high voltage is applied to the row signal lines 24 and the column signal lines 26. Therefore, no defective display is produced. As a result, limitations on interconnection resistance; capacitance of the insulating layers; resistivity and dielectric constants of the materials used; film thickness; and line width, are significantly reduced.

In Example 2, both the row signal lines and the column signal lines are formed on one of the substrates. However, the row signal lines and the column signal lines may be formed otherwise. For example, the row signal lines and the column signal lines may be formed on different substrates. Alternatively, a liquid crystal display device having a single substrate may be produced. In this case, a liquid crystal layer in the form of a film may be formed on the substrate having both the row signal lines and the column signal lines, or a liquid crystal layer may be coated on the substrate.

According to the liquid crystal display device of Example 2, patterning is conducted by a printing method, whereby an accuracy of about several tens of micrometers is obtained. Although this accuracy is lower than that (i.e., about 1 μm) achieved by the conventional photolithography technology, no defective display was recognized in the liquid crystal display device of Example 2.

The use of the process according to Example 2 eliminates the need for a photolithography process and a vacuum film-forming process. Accordingly, the production cost can be significantly reduced.

EXAMPLE 3

Hereinafter, Example 3 of the present invention will be described.

Figure 9:
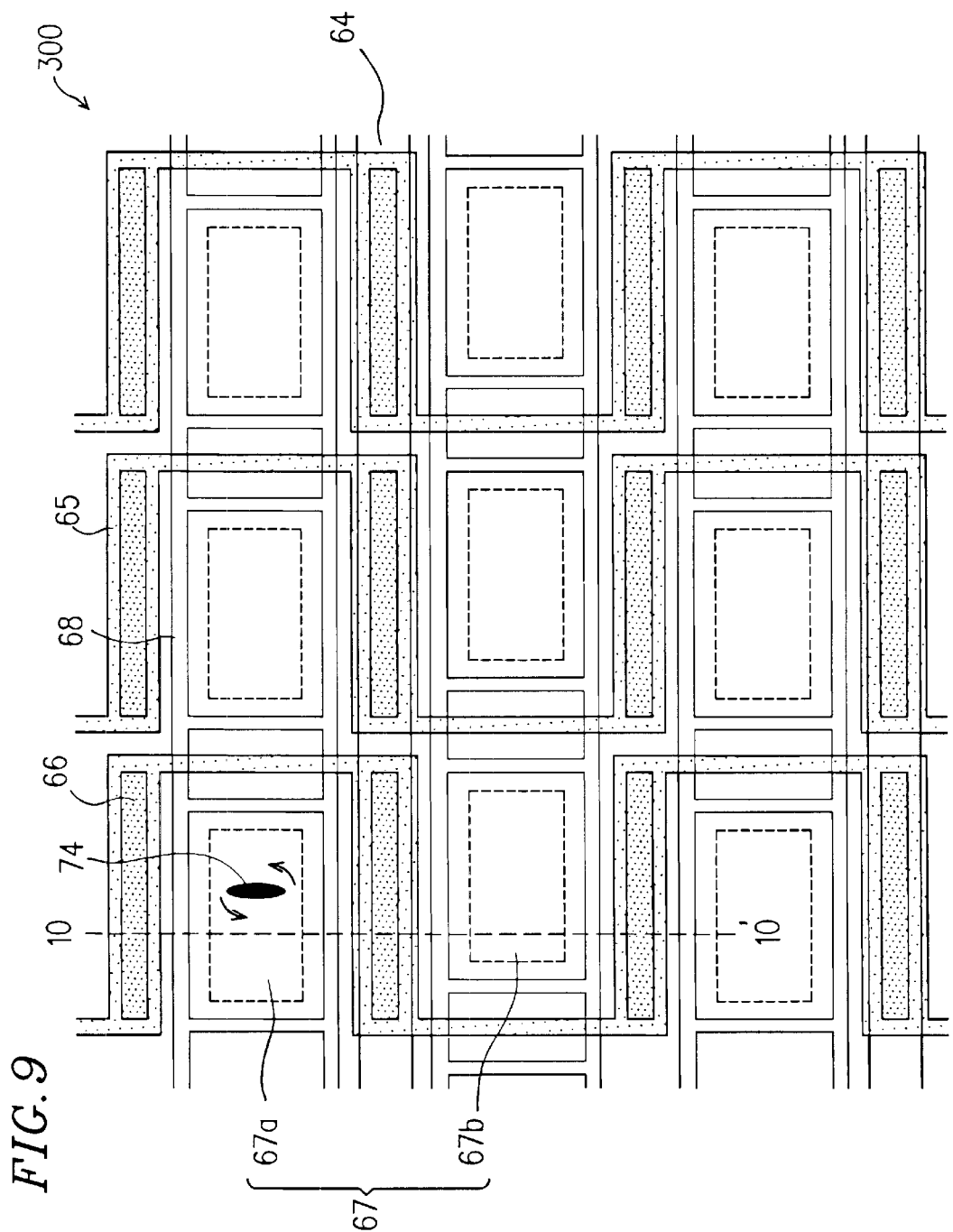
FIG. 9 is a plan view of a liquid crystal display device according to Example 3 of the present invention, wherein a counter substrate facing a matrix substrate is omitted.
Figure 10:
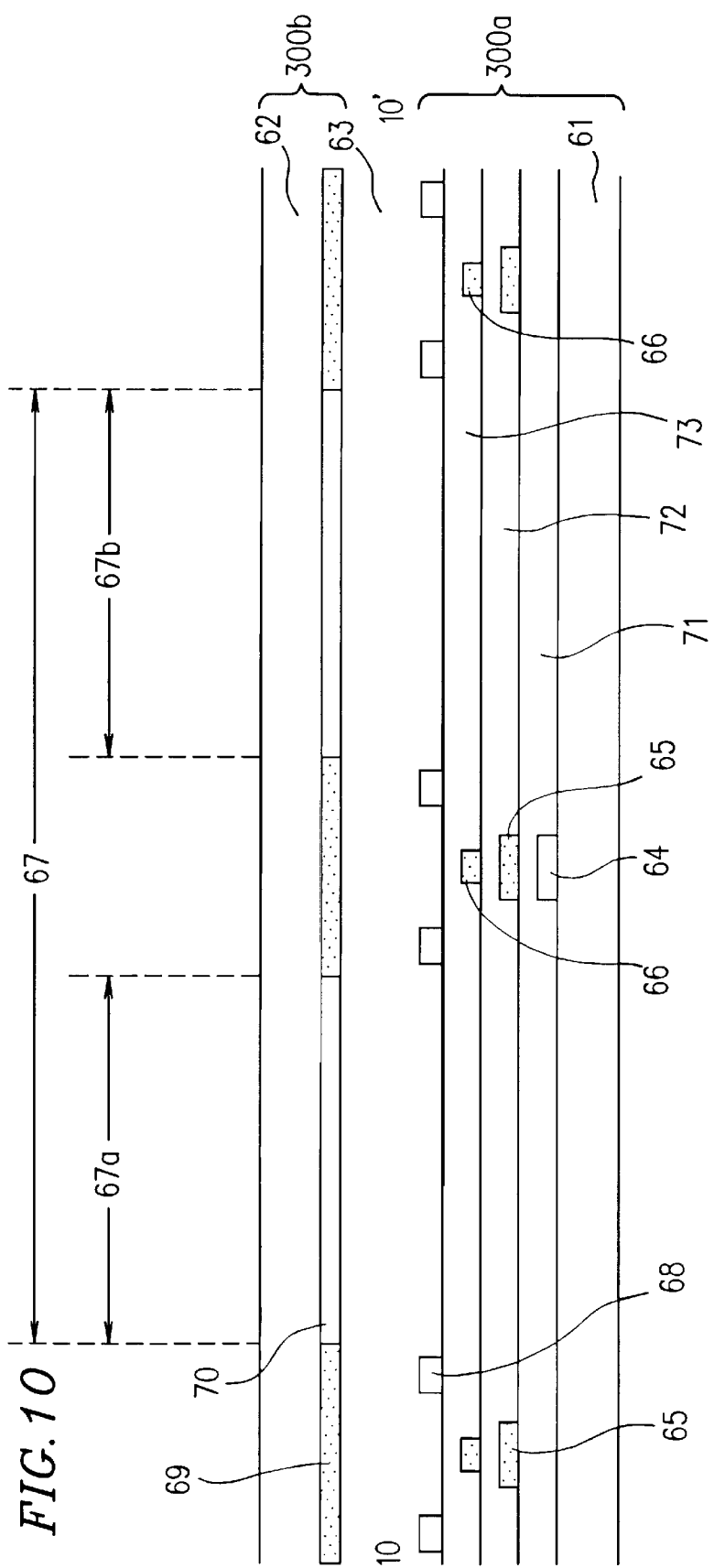
FIG. 10 is a cross sectional view taken along line 10–10' of FIG. 9.

FIG. 9 is a plan view of a liquid crystal display device 300 according to Example 3 of the present invention. Note that a counter substrate 300b as shown in FIG. 10 is omitted in FIG. 9. FIG. 10 is a cross sectional view taken along line 10–10' of FIG. 9.

The liquid crystal display device 300 includes a matrix substrate 300a, the counter substrate 300b facing the matrix substrate 300a, and a liquid crystal layer 63 interposed therebetween. The liquid crystal layer 63 is formed by introducing a liquid crystal material into the gap between the matrix substrate 300a and the counter substrate 300b.

A structure of the matrix substrate 300a will now be described. Row signal lines 64 are formed parallel to each other. Each column signal line 65 has a bent pattern as shown in FIG. 9 so as to have laterally extending portions, that is, portions extending in the row direction. Therefore, the laterally extending portions are parallel to the row signal lines 64. Thus, each of the laterally extending portions and a corresponding portion of the row signal lines 64 forms a parallel portion. The row signal lines 64 are provided so as to correspond to every other laterally extending portion. Each row signal line 64 overlaps a corresponding one of the laterally extending portions. A ferromagnetic element piece 66 is formed at each of the laterally extending portions of the column signal line 65. A single pixel region 67 includes a pair of openings 67a and 67b interposing a corresponding row signal line 64 therebetween. Shielding electrodes 68 are formed so as to surround each of the openings 67a and 67b.

A structure of the counter substrate 300b will now be described. A light-shielding film 69 having the openings 67a and 67b is formed on the substrate 62. Each of the openings 67a and 67b correspond to the regions surrounded by the row signal lines 64 and the column signal lines 65. Each pair of openings 67a and 67b correspond to a single pixel region 67. A color filter 70 is formed in the openings 67a and 67b. A single pixel region 67 is defined as a region in which its optical state is independently varied according to a magnetic field from three successive laterally extending portions of each of the column signal lines 65, two of which define an outer periphery of the pixel region, and a magnetic field from the row signal line 64 provided in the vicinity of the laterally extending portion located between the two laterally extending portion defining the outer periphery.

Hereinafter, a method for producing the liquid crystal display device 300 according to Example 3 will be described.

The matrix substrate 300a is produced as follows: first, an electrically conductive Ag paste is applied on a first substrate 61 by a printing method, whereby the row signal lines 64 having a thickness of about 1 μm are formed. The first substrate 61 is a transparent, insulating substrate which is formed from glass, plastic or the like.

Next, the resultant substrate 61 is coated with $SiO_2$ by a dipping process using a sol-gel method, whereby an insulating film 71 having a thickness of about 1.5 μm is formed.

Then, an electrically conductive Ag paste is applied thereon by a printing method, whereby the column signal lines 65 having a thickness of about 1 μm are formed. Then, the resultant substrate 61 is coated with $SiO_2$ by a dipping process using a sol-gel method, whereby an insulating film 72 having a thickness of about 1.5 μm is formed.

Thereafter, a paste containing ferromagnetic grains of a Fe-Si type material is applied with a thickness of about 1 μm, whereby the ferromagnetic element pieces 66 are formed. Then, the resultant substrate 61 is coated with SiO$_2$ by a dipping process using a sol-gel method, whereby an insulating film 73 having a thickness of about 1.5 μm is formed.

Then, an electrically conductive Ag paste is applied thereon by a printing method, whereby the shielding electrodes 68 having a thickness of about 1 μm are formed. Thus, the matrix substrate 300a is completed.

It should be noted that, instead of the dipping process, a spin coating method or a printing method can alternatively be used to form each of the insulating films.

The counter substrate 300b is formed as follows: a photo-sensitive black resin is patterned so as to form the light-shielding film 69 on a second substrate 62. The second substrate 62 is a transparent, insulating substrate which is formed from glass, plastic or the like. Thereafter, the color filter 70 is formed in the openings 67a and 67b by a printing method. Thus, the counter substrate 300b is completed. It should be noted that the counter substrate 300b may alternatively be formed prior to the formation of the matrix substrate 300a.

Then, an alignment film of polyimide (not shown) is formed by a printing method on each of the surfaces of the matrix substrate 300a and the counter substrate 300b facing the liquid crystal layer 63, and the alignment films are subject to a rubbing treatment. Thereafter, using, for example, a spacer (not shown), the matrix substrate 300a and the counter substrate 300b are attached to each other with a prescribed space therebetween, and a liquid crystal material having a negative anisotropy of magnetic susceptibility is introduced into the gap between the matrix substrate 300a and the counter substrate 300b. Then, a sealing process is conducted, whereby the liquid crystal layer 63 is formed. Thus, the liquid crystal display device 300 of Example 3 is completed.

A method for driving the liquid crystal display device 300 according to Example 3 of the present invention will now be described.

Figure 11:
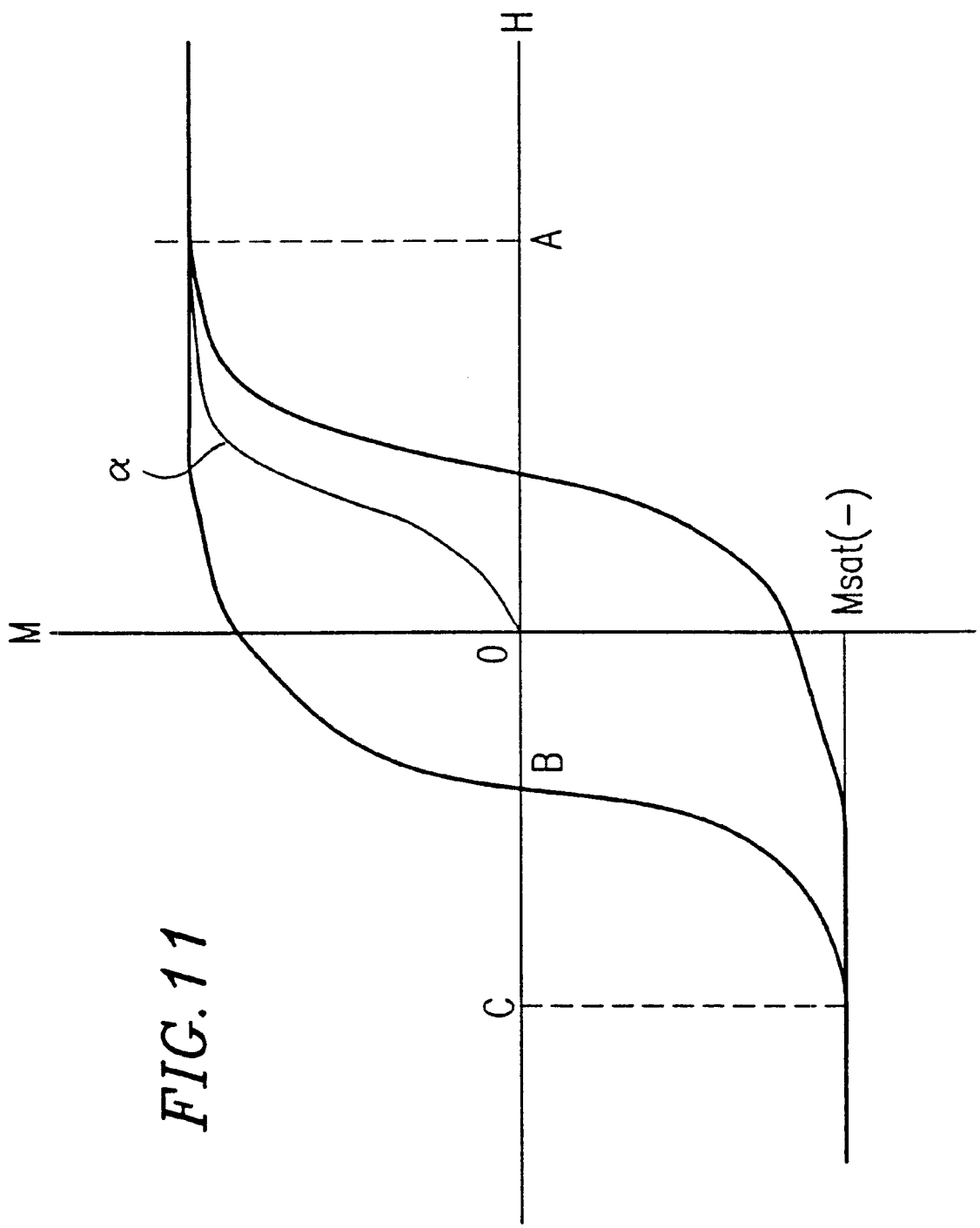
FIG. 11 is a graph illustrating magnetization characteristics of a ferromagnetic element piece provided in the liquid crystal display device according to Example 3 of the present invention.

The ferromagnetic element pieces 66 have magnetic characteristics with a hysteresis as shown in FIG. 11. In the graph of FIG. 11, the abscissa indicates a magnetic field H, and the ordinate indicates a magnetization value M. Referring to FIG. 11, in order to arbitrarily magnetize the ferromagnetic element pieces 66, the magnetic field H is first reduced from the value A to the value B to obtain the magnetization value M=0. Then, the magnetic field H is increased from B to the range of zero to A. In this case, a magnetization curve a is obtained. Using the magnetization curve α, the magnetization value M can be arbitrarily determined.

Figure 12:
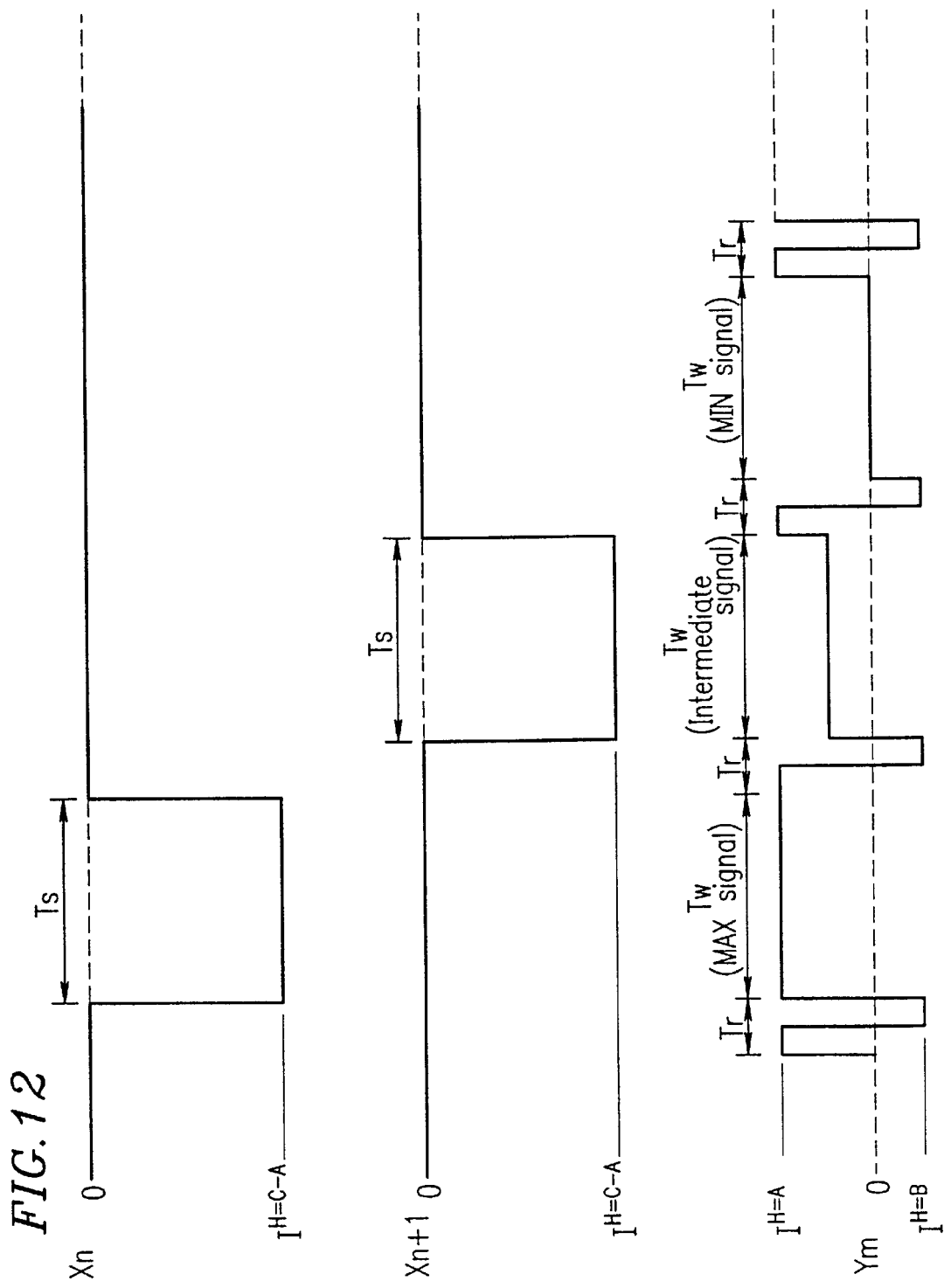
FIG. 12 is a timing chart of current values in a method for driving the liquid crystal display device according to Example 3 of the present invention.

Hereinafter, a method for driving the liquid crystal display device 300 according to the above-mentioned principle will be described with reference to FIG. 12. FIG. 12 shows a timing chart with respect to current values.

A row selection signal is applied to the row signal lines, whereas an image signal is applied to the column signal lines. More specifically, a row selection signal $X_n$ is applied to the nth row signal line during a row selection period Ts. The signal $X_n$ supplies a current $I^{H=C-A}$ which produces a magnetic field H=C-A. A current is not supplied to the row signal line during a non-selection period. The row selection signal is sequentially applied to the row signal lines (n+1, n+2, . . . ), whereby the screen is scanned.

On the other hand, an image signal Ym is applied to the mth column signal line. During a write period Tw corresponding to the row selection period Ts, the signal m applies a current $I^{H=O-A}$ which produces a magnetic field H ranging from zero to A according to the applied image signal.

During a reset period Tr following the write period Tw, the signal Ym first supplies a current $I^{H=A}$ producing a magnetic field H=A, and then, supplies a current $I^{H=B}$ producing a magnetic field H=B.

Figure 13:
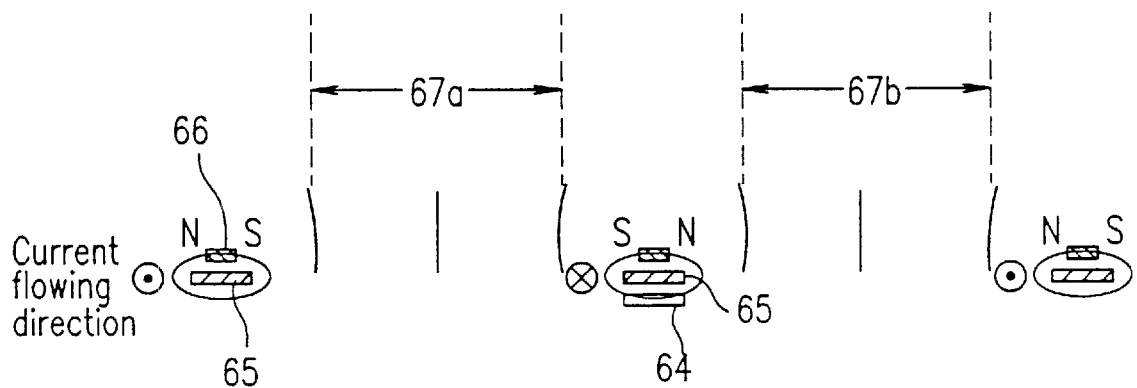
FIG. 13 is a cross sectional view schematically showing a magnetic field at a pixel region in the liquid crystal display device according to Example 3 of the present invention.
Figure 14:
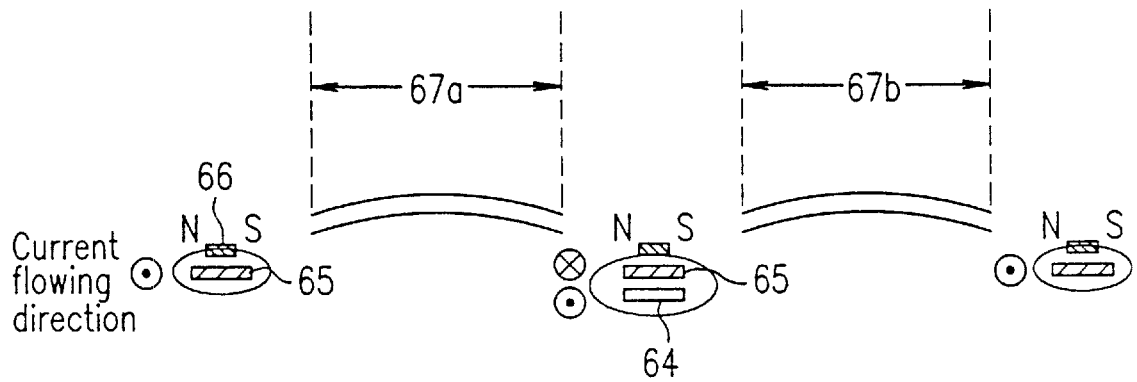
FIG. 14 is a cross sectional view schematically showing a magnetic field at a pixel region in the liquid crystal display device according to Example 3 of the present invention.
Figure 15:
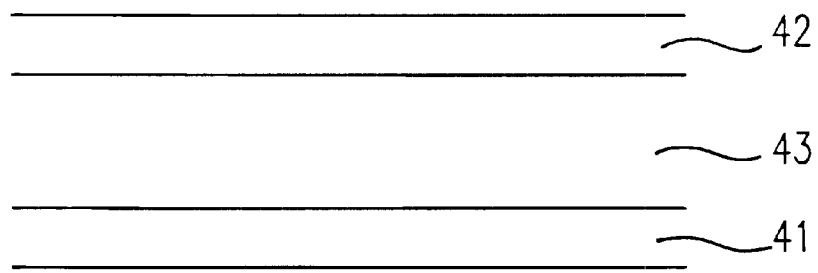
FIG. 15 is a cross sectional view of a conventional liquid crystal display device.
Figure 16:
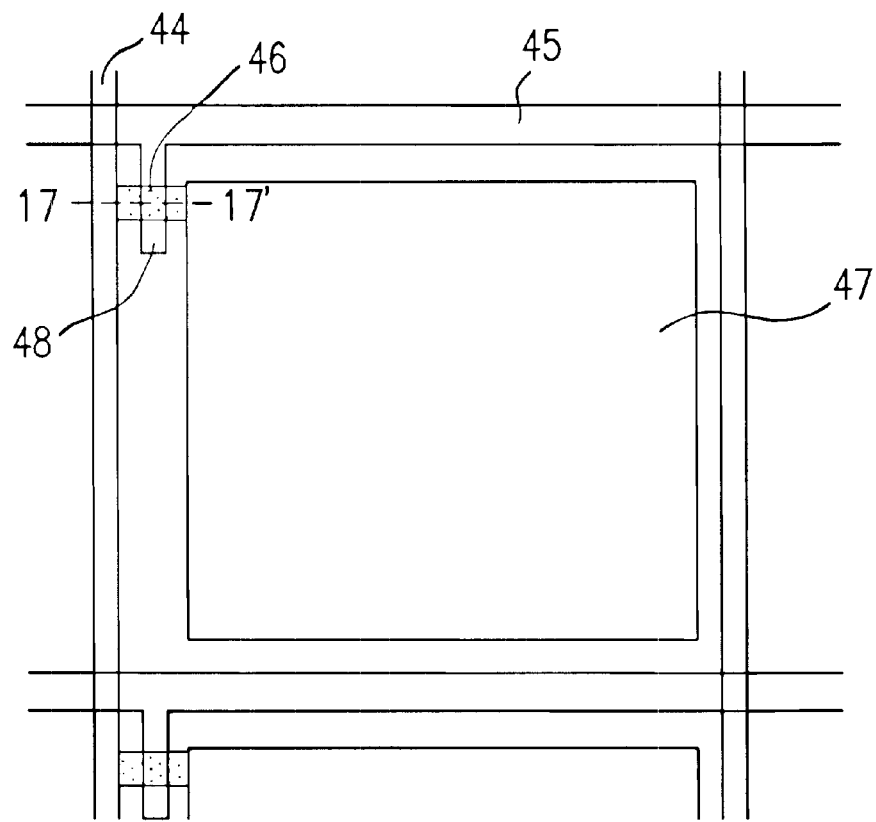
FIG. 16 is a plan view of a matrix substrate used in the conventional liquid crystal display device.
Figure 17:
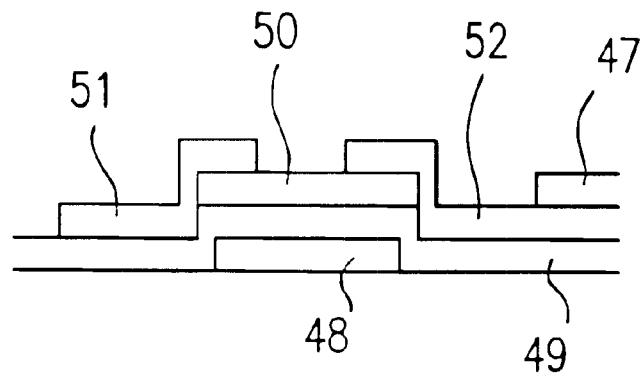
FIG. 17 is a cross sectional view taken along line D–D' of FIG. 16.
Figure 18:
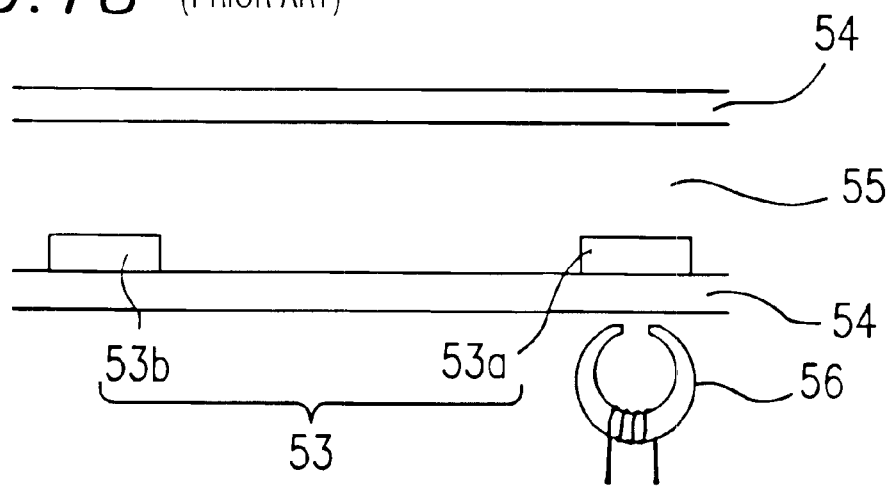
FIG. 18 is a cross sectional view schematically showing another conventional liquid crystal display device.

A change in magnetization of the ferromagnetic element pieces in the driving method described above will now be described with reference to FIGS. 13 and 14. FIGS. 13 and 14 are schematic diagrams each illustrating a magnetic field at a pixel region 67.

During the non-selection period, a current does not flow in the row signal lines. Accordingly, only a magnetic field from the column signal lines is applied to the ferromagnetic element pieces. The magnetic field H from the column signal lines is reduced from A to B during the reset period Tr, whereby the magnetization value M=0 is obtained. Therefore, a magnetization value M can be arbitrarily determined according to the applied image signal by varying the magnetic field H in the range from zero to A during the write period Tw. At this time, the ferromagnetic element pieces 66 have alternate magnetization directions, as shown in FIG. 13. More specifically, every other ferromagnetic element piece 66 has the same magnetization direction. Therefore, at the openings 67a and 67b corresponding to the pixel region 67, only a vertical magnetic field to the substrate is produced as shown in FIG. 13.

During the row selection period, the magnetic field H=C-A is applied to the selected row signal line. Therefore, the ferromagnetic element pieces 66 located adjacent to the row signal line 64 have a magnetization value M=Msat(-). However, the other ferromagnetic element pieces 66, that is, the ferromagnetic element pieces 66 which are not adjacent to the row signal line have the same magnetization value as that obtained during the non-selection period. Therefore, during the row selection period, all of the ferromagnetic element pieces 66 have the same magnetization direction, as shown in FIG. 14. As a result, a strong horizontal magnetic field is produced at the openings 67a and 67b corresponding to the pixel region 67, as shown in FIG. 14.

As can be seen from the foregoing description, a strong horizontal magnetic field can be produced only during the row selection period. Due to the rubbing treatment, liquid crystal molecules 74 are aligned in the direction perpendicular to the length of ferromagnetic element pieces 66, as shown in FIG. 9. Therefore, when a horizontal magnetic field is produced in the direction perpendicular to the ferromagnetic elements 66 during the row selection period, this horizontal magnetic field causes the liquid crystal molecules 74 to rotate horizontally, whereby optical modulation corresponding to the rotation of the liquid crystal molecules 74 can be achieved. Although a vertical magnetic field is produced during the non-selection period, the liquid crystal molecules 74 are not affected by the vertical magnetic field. Therefore, duty driving can be conducted with orientation of the liquid crystal molecules 74 being controlled only by a magnetic field produced during the selection period.

The current values applied to the row signal lines and the column signal lines in Example 3 are exemplary only. For example, inverted current values may alternatively be supplied to the row signal lines and the column signal lines. Another driving method of the row signal lines and the column signal lines may alternatively be used. For example, a current flowing direction may be reversed on a field-by-field basis or on a row-by-row basis.

According to Example 3 of the present invention, the shielding electrodes 68 are connected to ground, thereby preventing an electric field from leaking from the row signal lines and/or the column signal lines into a pixel region(s). Accordingly, the liquid crystal can be driven by a magnetic field regardless of an applied voltage. Accordingly, the limitations on resistivity of the materials used in the row signal lines, the column signal lines and the like; dielectric constants of the insulating layers and the like; and film thickness and line width thereof, can be significantly reduced.

Although all of the row signal lines, the column signal lines and the ferromagnetic element pieces are formed on a single substrate in Example 3, the present invention is not limited to such a structure. For example, the row signal lines and the column signal lines may be formed on different substrates, and the ferromagnetic element pieces may be formed on one of the substrates. Another way of forming the row signal lines, the column signal lines and the ferromagnetic element pieces is also possible within the scope of the present invention.

Although the liquid crystal display device of Example 3 includes two substrates, the present invention is not limited to this. For example, a liquid crystal display device may alternatively have a single substrate. In this case, a liquid crystal layer in the form of a film may be formed on the substrate having both the row signal lines and the column signal lines, or a liquid crystal layer may be coated on the substrate.

Although a glass substrate is used for the substrates in Examples 1, 2 and 3, another material may alternatively be used for the substrates. For example, a substrate in the form of a film of another material such as a resin may be used.

According to the liquid crystal display device of Example 3, patterning is conducted by a printing method, whereby an accuracy of about several tens of micrometers was obtained. Although this accuracy is lower than that (i.e., about 1 $\mu$m) achieved by the conventional photolithography technology, no defective display was recognized in the liquid crystal display device of Example 3.

The use of the process according to Example 3 eliminates the need for a photolithography process and a vacuum film-forming process. Accordingly, the production cost can be significantly reduced.

Although the ferromagnetic element pieces of Example 3 are formed from a Fe—Si type material, they may alternatively be formed from Fe—N, Fe—B, Fe—C, Fe—B—C, Fe—Si—C, Fe—Si—B, Fe—Al, Fe—Al—Si, Fe—Si—O, $Fe_2O_3$, Co—Fe—B or the like. In order to vary the magnetic susceptibility of a liquid crystal material, small, needle-shaped pieces of a magnetic material may be covered with a surfactant, whereby the resultant pieces may be dispersed within the liquid crystal layer. Another method may alternatively be used to vary the magnetic susceptibility of the liquid crystal material.

In Example 3, patterning of the row signal lines, the column signal lines and the shielding electrodes is not limited to that described in Example 3. Moreover, a driving method of the row signal lines and the column signal lines is not limited to that described in Example 3. Other patterning and driving methods may alternatively be used as long as ferromagnetic element pieces are formed adjacent to at least one signal line of one of the row signal lines and the column signal lines, and the ferromagnetic element pieces are magnetized so that the optical state of the liquid crystal layer is varied by the magnetic field produced in a pixel region.

Although each of the column signal lines has a bent pattern so as to have a plurality of portions extending in the row direction in Examples 1, 2 and 3, the present invention is not limited to this. For example, at least one of the column signal lines may alternatively have a bent pattern so as to have only one portion extending in the row direction. Alternatively, at least one of the row signal lines may have a bent pattern so as to have at least one portion extending in the column direction.

According to the present invention, materials for the row signal lines, the column signal lines, the shielding electrodes and the insulating films are not limited to those shown in the above examples. The row signal lines, the column signal lines and the shielding electrodes may alternatively be formed from Ta, Mo, Cr, W, Cu, Au or the like. Moreover, the insulating layers may alternatively be formed from SiNx, $Al_2O_3$ or the like.

According to the present invention, in order to increase the magnetic susceptibility of a liquid crystal material, small, needle-shaped pieces of a magnetic material may be covered with a surfactant, whereby the resultant pieces may be dispersed within the liquid crystal layer. Another method may alternatively be used to increase the magnetic susceptibility of the liquid crystal material.

According to the present invention, various materials and dimensions may be appropriately used, taking the following points into consideration: the size of the liquid crystal display device, conditions on driving voltage and driving current, production capability of the process used, price of the materials used, or the like.

As the size of a liquid crystal display device is increased, an expensive production apparatus is required for producing a conventional liquid crystal display device with a high production capability. On the other hand, according to the present invention and modifications thereof, an inexpensive production apparatus and a simple process having an excellent production capability can be employed. Therefore, the production cost can be significantly reduced even when a large liquid crystal display device is produced.

According to the conventional driving method using an electric field, patterning of pixel electrodes and thin film transistors must be conducted with a high accuracy of, for example, about 1 $\mu$m or less. Therefore, the photolithography technology using an expensive exposure apparatus having a projection lens system is required, preventing reduction in production cost. However, according to the present invention, the liquid crystal can be driven by the row signal lines and the column signal lines, or by the row signal lines, the column signal lines and the ferromagnetic element pieces. Moreover, it is sufficient to achieve the pattern accuracy in the range from several tens of micrometers to about 100 $\mu$m. Therefore, exposure and printing processes can be conducted by a proximity large-scale exposure technique and a printing method which have a low pattern accuracy. As a result, the production cost can be reduced and the production yield can be improved, providing an inexpensive liquid crystal display device. The production cost can be significantly reduced especially for a large liquid crystal display device.

Moreover, an active element such as a thin film transistor is not necessary. Therefore, an insulating film can be formed by a simple coating method.

Furthermore, the liquid crystal is driven by a magnetic field. Therefore, the specific resistance of a liquid crystal layer is not limited, whereby defective display resulting from non-uniform distribution of charges within the liquid crystal layer is prevented.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A liquid crystal display device, comprising:
a liquid crystal layer;
a plurality of row signal lines for driving the liquid crystal layer; and
a plurality of column signal lines for driving the liquid crystal layer, wherein
an optical state of the liquid crystal layer is varied by a magnetic field produced by at least one row signal line of the plurality of row signal lines and a magnetic field produced by at least one column signal line of the plurality of column signal lines, and
wherein at least one signal line of one of the plurality of row signal lines and the plurality of column signal lines is partially bent so as to have a signal line portion extending parallel to at least one signal line of the other of the plurality of row signal lines and the plurality of column signal lines, the signal line portion and the at least one signal line of the other of the plurality of row signal lines and the plurality of column signal lines forming a parallel portion, and
the optical state of the liquid crystal layer is varied by a synthesized magnetic field produced by a difference between a current flowing in at least one of the signal line portions and a current flowing in at least one signal line which forms the parallel portion.

2. A liquid crystal display device according to claim 1, further comprising:
a ferromagnetic element piece provided adjacent to at least one of the signal line portion and the at least one signal line which forms the parallel portion, wherein the ferromagnetic element piece is magnetized by the synthesized magnetic field.

3. A liquid crystal display device according to claim 1, wherein
a shielding electrode for preventing an electric field from being formed within pixel regions is formed in an inner periphery of each of the pixel regions, the optical state of each of the pixel regions being independently varied by a synthesized magnetic field produced from a difference between currents flowing in the plurality of row signal lines and currents flowing in the plurality of column signal lines.

4. A liquid crystal display device according to claim 1, wherein
an alignment direction of liquid crystal molecules in the liquid crystal layer is controlled by controlling currents flowing in the plurality of the row signal lines and the plurality of the column signal lines.

5. A liquid crystal display device, comprising:
a liquid crystal layer;
a plurality of row signal lines for driving the liquid crystal layer; and
a plurality of column signal lines for driving the liquid crystal layer, wherein
an optical state of the liquid crystal layer is varied by a magnetic field produced by at least one row signal line of the plurality of row signal lines and a magnetic field produced by at least one column signal line of the plurality of column signal lines, and
wherein
at least one signal line of one of the plurality of row signal lines and the plurality of column signal lines is a first signal line, the first signal line being partially bent so as to have a signal line portion extending parallel to at least one other signal line of the other of the plurality of row signal lines and the plurality of column signal lines, the signal line portion and the at least one other signal line forming a parallel portion,
the one of the plurality of row signal lines and the plurality of column signal lines includes a second signal line which is partially bent so as to overlap the first signal line, the second signal line and the first signal line interposing the liquid crystal layer therebetween, and
the optical state of the liquid crystal layer is varied by a synthesized magnetic field produced by a difference between currents flowing in at least one of the second signal line, the signal line portion and the at least one other signal line.

6. A liquid crystal display device according to claim 5, further comprising:
a ferromagnetic element piece provided adjacent to at least one of the signal line portion and the at least one other signal line, wherein
the ferromagnetic element piece is magnetized by the synthesized magnetic field.

7. A liquid crystal display device according to claim 5, wherein
a shielding electrode for preventing an electric field from being formed within pixel regions is formed in an inner periphery of each of the pixel regions, the optical state of each of the pixel regions being independently varied by a synthesized magnetic field produced from a difference between currents flowing in the plurality of row signal lines and currents flowing in the plurality of column signal lines.

8. A liquid crystal display device, comprising:
a liquid crystal layer interposed between a pair of substrates;
a plurality of first signal lines producing a magnetic field to be applied to the liquid crystal layer; and
a plurality of second signal lines producing a magnetic field to be applied to the liquid crystal layer, wherein
the liquid crystal layer includes a plurality of pixel regions arranged in a matrix, an optical state of each of the plurality of pixel regions is independently varied by magnetic fields produced by the plurality of first signal lines and by the plurality of second signal lines,
each of the plurality of first signal lines alternately has a plurality of first portions extending in a first direction and a plurality of second portions extending in a second direction perpendicular to the first direction,
each of the plurality of second signal lines is provided in a vicinity of a respective one of the plurality of first portions and is respectively located between two other of the plurality of first portions which are adjacent to the respective one of the plurality of first portions, and
an optical state of each of the plurality of pixel regions is varied by magnetic fields produced by the one of the plurality of first portions, the two other of the plurality of first portions, and a respective one of the plurality of second signal lines.

9. A liquid crystal display device according to claim 8, further comprising:
a third signal line formed on one of the substrates which faces the other substrate having the first signal lines, the third signal line having a shape overlapping a shape of the first signal lines, wherein
an optical state of each of the plurality of pixel regions is varied by magnetic fields produced by the one of the plurality of first portions, the two other of the plurality of first portions, the respective one of the plurality of second signal lines, and the third signal line.

10. A liquid crystal display device according to claim 8, further comprising:
ferromagnetic element pieces provided adjacent to the plurality of first portions of the first signal lines, wherein
the ferromagnetic element pieces are magnetized by the magnetic fields.

11. A liquid crystal display device, comprising:
a liquid crystal layer;
a plurality of row signal lines for driving the liquid crystal layer; and
a plurality of column signal lines for driving the liquid crystal layer,
wherein at least one signal line of one of the plurality of row signal lines and the plurality of column signal lines is partially bent so as to have a signal line portion extending parallel to at least one signal line of the other of the plurality of row signal lines and the plurality of column signal lines, the signal line portion and the at least one signal line of the other of the plurality of row signal lines and the plurality of column signal lines forming a parallel portion, and
wherein an optical state of the liquid crystal is varied by a synthesized magnetic field produced by a difference between a current flowing in at least one row signal line of the plurality of row signal lines and a current flowing in at least one column signal line of the plurality of column signal lines.

12. A liquid crystal display device according to claim 11, further comprising:
a shielding electrode for preventing an electric field from being formed within pixel regions formed in an inner periphery of each of the pixel regions, an optical state of each of the pixel regions being independently varied by a synthesized magnetic field from a difference between currents flowing in the plurality of row signal lines and currents flowing in the plurality of column signal lines.

13. A liquid crystal display device, comprising:
first signal lines formed on a first substrate;
second signal lines formed on the first substrate, each second signal line having a serpentine pattern of alternating first and second portions, the first portions being parallel to the first signal lines and the second portions being perpendicular to the first signal lines; and
third signal lines formed on a second substrate, each third signal line having a serpentine pattern of alternating first and second portions, wherein the third signal lines are in overlapping correspondence with the second signal lines when the first substrate and the second substrate face each other,
wherein an optical state of a liquid crystal layer interposed between the first and second substrates is varied by magnetic fields produced by selectively causing currents to flow in the first, second and third signal lines.

14. A liquid crystal display device according to claim 13, wherein the first signal lines are arranged in correspondence with alternating ones of the first portions of the second signal lines.

15. A liquid crystal display device according to claim 14, wherein a resultant magnetic field is produced in a respective pixel region of the liquid crystal display device by causing a non-zero current to flow in the first signal line corresponding to the respective pixel region; a current of first magnitude and a first direction to flow in a second signal line corresponding to the respective pixel region; and
a current of a second magnitude, different from the first magnitude, and a second direction, opposite to the first direction, to flow in the third signal line that is in overlapping correspondence with the second signal line, and
wherein the currents flowing in the first signal line and in the first portion of the second signal line corresponding thereto are in opposite directions.

16. A liquid crystal display device according to claim 13, further comprising:
shield electrodes arranged on the second substrate to prevent electric fields from being formed within pixel regions of the liquid crystal display device.

17. A liquid crystal display device according to claim 13, wherein the first signal lines are row signal lines, the second signal lines are first column signal lines, and the third signal lines are second column signal lines.

18. A liquid crystal display device, comprising:
first signal lines; and
second signal lines, each second signal line having a serpentine pattern of alternating first and second portions, the first portions being parallel to the first signal lines and the second portions being perpendicular to the first signal lines,
wherein the serpentine patterns of adjacent second signal lines are opposites of each other, and
wherein an optical state of a liquid crystal layer is varied by magnetic fields produced by selectively causing currents to flow in the first signal lines and the second signal lines.

19. A liquid crystal display device according to claim 18, wherein the first signal lines are arranged in correspondence with alternating ones of the first portions of the second signal lines.

20. A liquid crystal display device according to claim 18, further comprising:
shield electrodes arranged to prevent electric fields from being formed within pixel regions of the liquid crystal display device.

21. A liquid crystal display device according to claim 18, wherein the first signal lines and the second signals lines are formed on the same substrate.

22. A liquid crystal display device according to claim 18, wherein the first signal lines and the second signal lines are formed on different substrates.

23. A liquid crystal display device according to claim 18, wherein the first signal lines are row signal lines and the second signal lines are column signal lines.

* * * * *